Patented Feb. 17, 1931

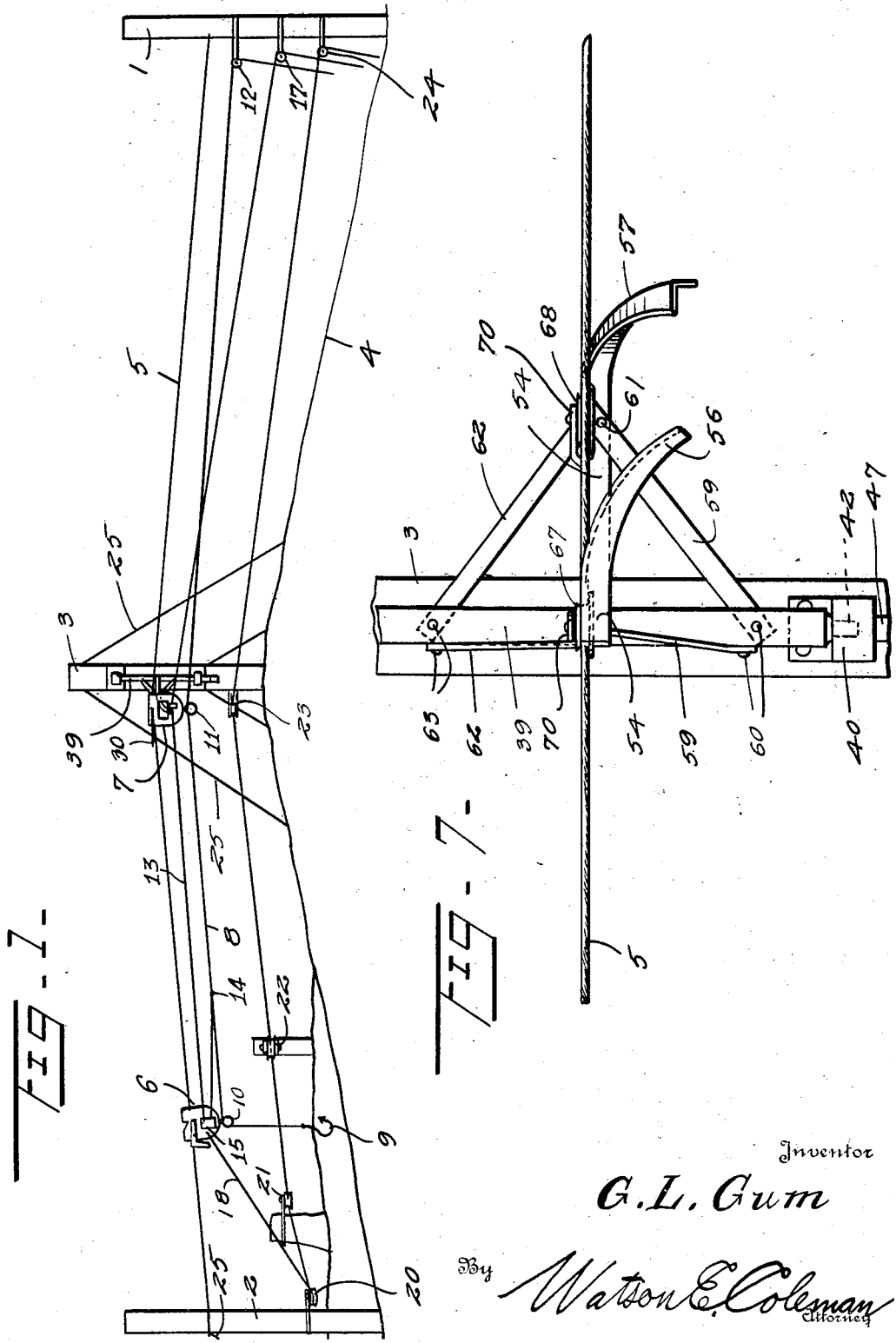

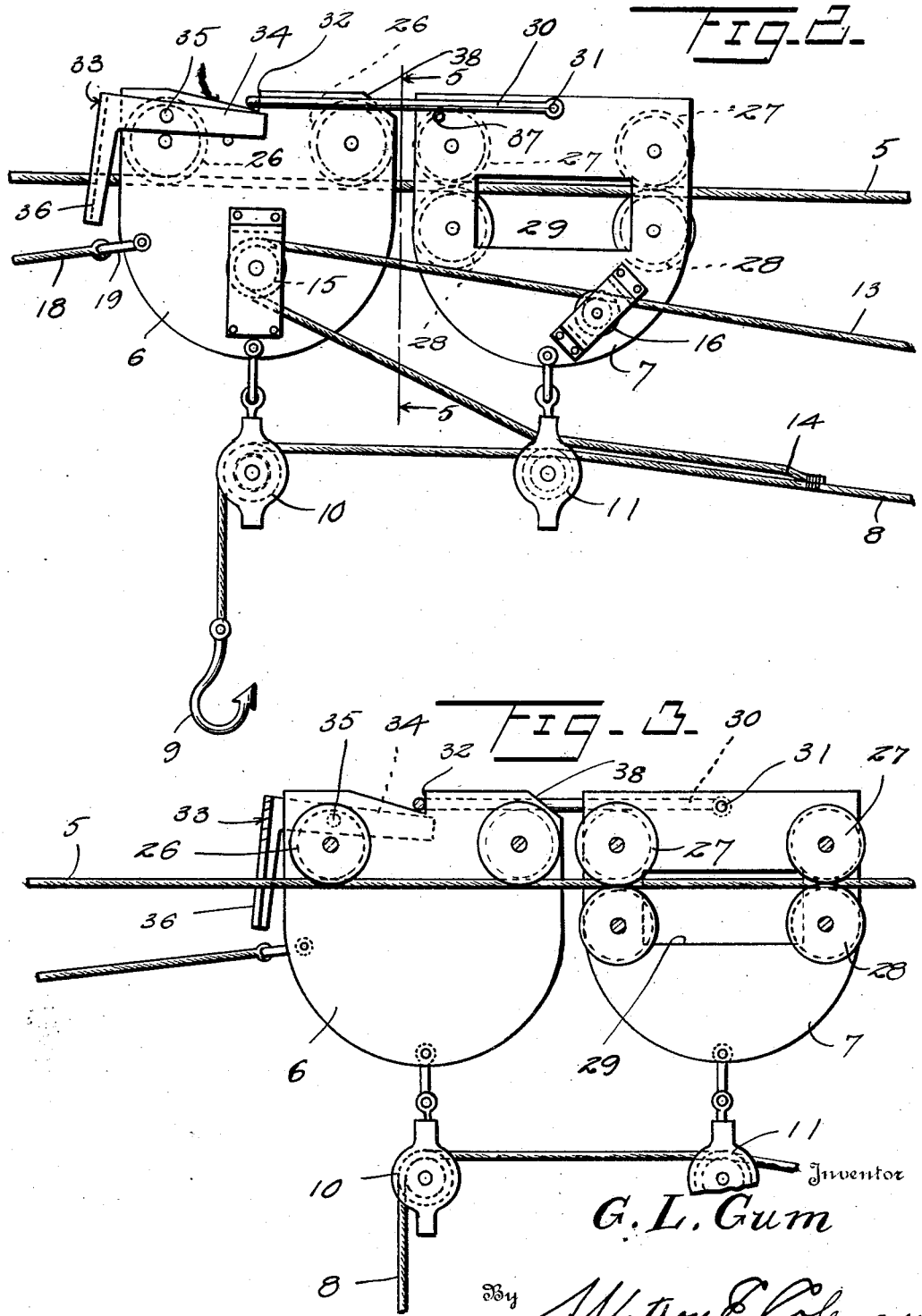

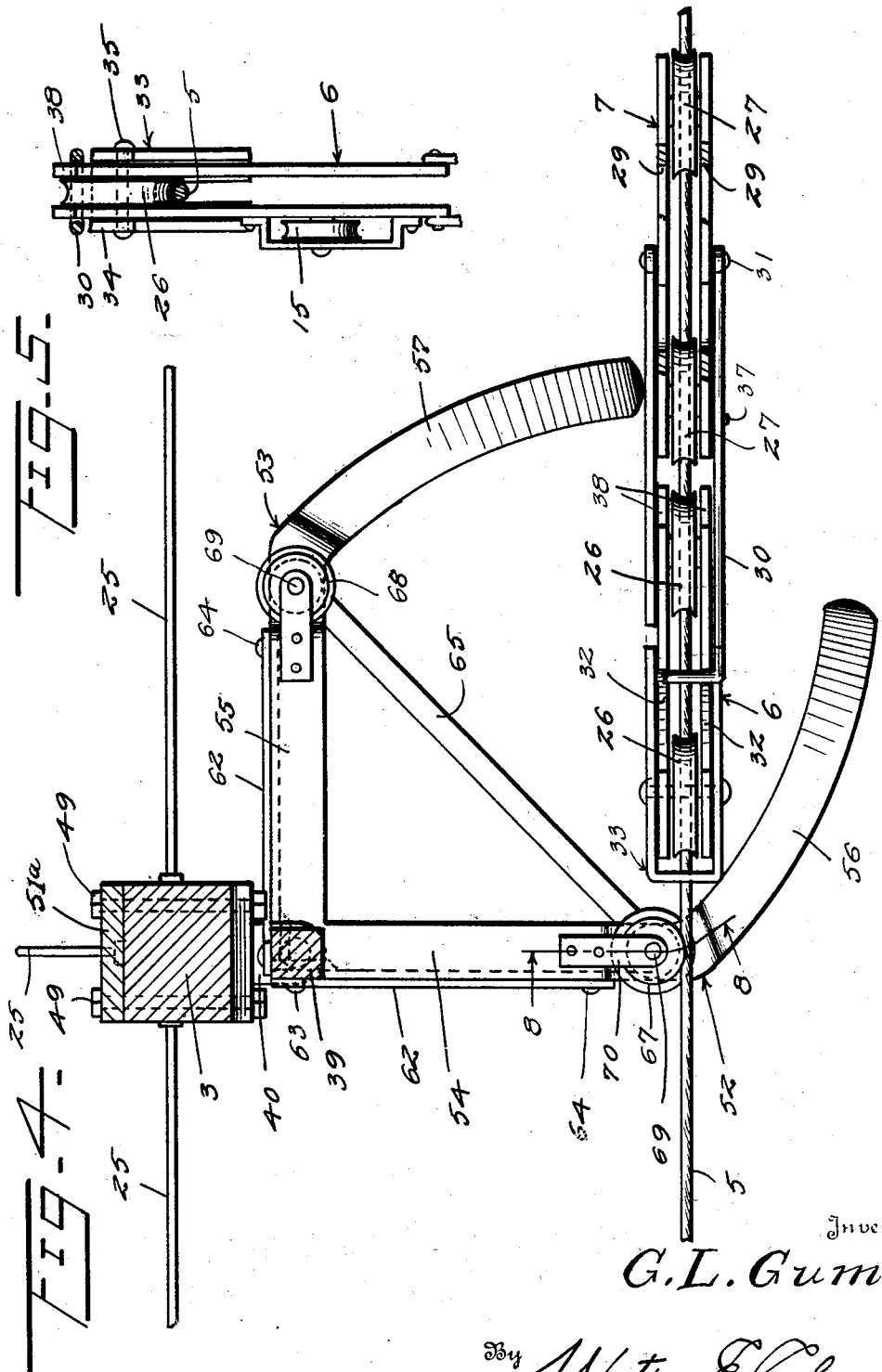

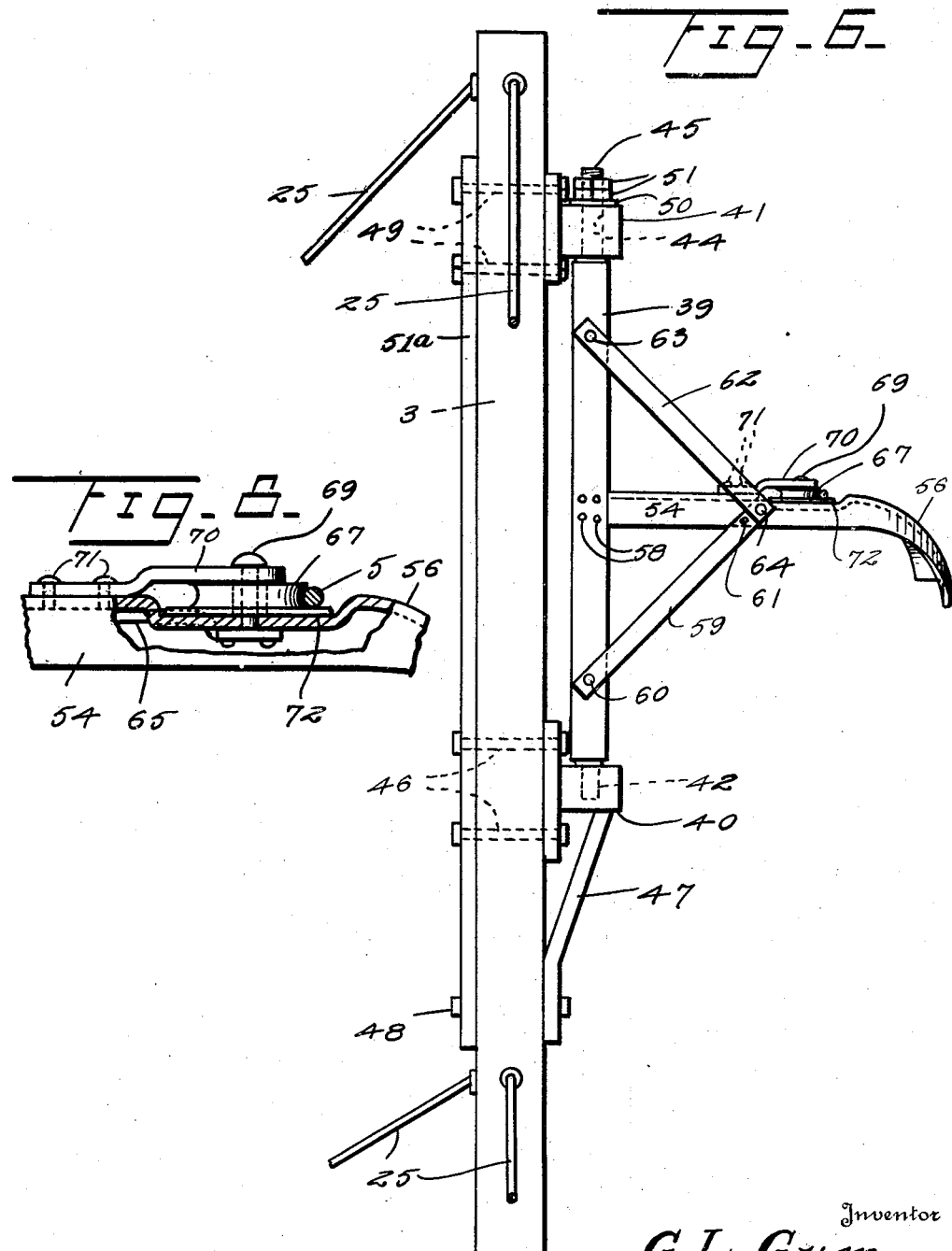

1,793,395

UNITED STATES PATENT OFFICE

GEORGE L. GUM, OF WILLIAMS RIVER, WEST VIRGINIA

LOG-SKIDDING APPARATUS

Application filed December 17, 1929. Serial No. 414,751.

This invention relates to log skidding apparatus of that type embodying a main cable extending between and secured at its ends to a skidder spar and a tail tree, a carriage or bicycle mounted on the main cable, a skidding cable passing through a sheave block connected to the skidder spar and through a sheave block suspended from the bicycle, a slack line connected to the skidding line and passing over a sheave journaled on the bicycle and through a sheave block connected to the skidder spar, and a re-haul line connected to the carriage and passing through sheave blocks on and near the tail tree and through a sheave block connected to the skidder spar.

The invention has for one of its objects to improve apparatus of the character stated and to provide one through the medium of which logs may be skidded from low ground to low ground over high ground.

To attain this and other objects, the nature of which will appear as the description proceeds, the invention comprehends the location of the skidder spar and tail tree at opposite sides of the base of the elevated ground or hill over which the logs are to be skidded, and the supporting of the main cable from a middle tree at the crest of the hill by means adapted to permit the bicycle to pass thereby in opposite directions.

The invention further comprehends the employment of an auxiliary bicycle for the skidding cable and slack line, the coupling of the auxiliary bicycle to said first or main bicycle for movement thereby from the skidder spar to the middle tree, the uncoupling of the auxiliary bicycle from the main bicycle at the middle tree, the maintaining of the auxiliary bicycle at the middle tree to provide an intermediate support for the skidding cable and slack line during the movement of the main bicycle from the middle tree in the direction of the tail tree and during its return movement to the middle tree.

The invention further comprehends the employment of main cable supporting means adapted to effect the uncoupling of the auxiliary bicycle from the main bicycle and adapted to maintain the auxiliary bicycle at the middle tree during the movement of the main bicycle from the middle tree in the direction of the tail tree and during its return to the middle tree.

The invention consists in the construction, combination and arrangement of parts hereinafter fully described and claimed, and illustrated in the accompanying drawings, wherein:—

Figure 1 is a view in front elevation of a log skidding apparatus constructed in accordance with my invention;

Figure 2 is a view in side elevation illustrating the manner in which the auxiliary bicycle is coupled to the main bicycle, the manner in which the bicycles are mounted upon the main cable, and the manner in which the skidding cable and slack line are associated with the bicycles;

Figure 3 is a sectional view taken on a vertical plane extending longitudinally through the bicycles;

Figure 4 is a view partly in horizontal section and partly in top plan of the means for supporting the main cable from the middle tree for releasing the auxiliary bicycle from the main bicycle and for arresting the movement of the auxiliary bicycle, the bicycles being shown in the positions they occupy immediately before the auxiliary bicycle is released from the main bicycle;

Figure 5 is a sectional view taken on the vertical plane indicated by the line 5—5 of Figure 2;

Figure 6 is a view in side elevation of the means for supporting the main cable from the middle tree, releasing the auxiliary bicycle from the main bicycle and arresting the movement of the auxiliary bicycle;

Figure 7 is a view in front elevation of this means, and

Figure 8 is a sectional view taken on the plane indicated by the line 8—8 of Figure 4.

Referring in detail to the drawings, 1 designates the skidder spar, 2 the tail tree, and 3 the middle tree of the log skidding apparatus. The skidder spar 1 and tail tree 2 are located at opposite sides of the base of the elevated ground or hill 4 over which the logs are to be skidded, and the middle tree 3 is arranged at the crest of the hill. A main cable 5 extends from the skidded spar 1 to the tail tree 2, and it is secured at its ends to these parts. A bicycle 6 and an auxiliary bicycle 7 are mounted upon the main cable 5. A skidding cable 8, which is provided at one end thereof with a hook 9, passes through a sheave block 10 on the main bicycle 6, a sheave block 11 on the auxiliary bicycle 7, and a sheave block 12 on the skidder spar 1. A slack line 13, which is secured, as at 14, to the skidding cable 8, passes over a sheave 15 on the main bicycle 6 and a sheave 16 on the auxiliary bicycle 7, and it passes through a sheave block 17 on the skidder spar 1. A re-haul line 18 is secured at one end, as at 19, to the main bicycle 6, and it passes through a sheave block 20 on the tail tree 2 and through sheave blocks 21 and 22 adjacent the tail tree 2. The re-haul line 18 passes through a sheave block 23 on the middle tree 3, and through a sheave block 24 on the skidder bar 1. Guy ropes 25 are employed to maintain the tail tree 2 and middle tree 3 in upright position.

The main bicycle 6 is supported on the main cable 5 through the medium of sheaves 26 which contact with the upper surface of the main cable. The auxiliary bicycle 7 is supported on the main cable 5 by sheaves 27 which contact with the upper surface of the main cable, and it is held against upward displacement with respect to the main cable by sheaves 28 which contact with the under side of the main cable.

The auxiliary bicycle 7 is provided with an opening 29 which extends transversely therethrough and above and below the main cable 5, and it is connected to the main bicycle 6 by a coupling link 30 which is of U-form and pivotally connected, as at 31, to the auxiliary bicycle. The coupling link 30 is pivoted to the auxiliary bicycle 7 near the upper side of the latter, and it extends forwardly beyond this bicycle and engages in a notch 32 formed in the upper side of the main bicycle 6. The coupling link 30 connects the auxiliary bicycle 7 to the main bicycle 6 to permit the former to be moved through the medium of the latter from the skidder spar 1 to the middle tree 3, and it is disengaged from the main bicycle when the bicycles reach the middle tree so as to permit the auxiliary bicycle to remain at the middle tree and to permit the main bicycle to move beyond the middle tree or in the direction of the tail tree. The coupling link 30 is disengaged from the main bicycle 6 through the operation of a trip 33, which is of U-form in plan and of angular form in elevation. The trip 33 has its horizontal arms 34 pivotally connected, as at 35, to the bicycle 6 and its vertical arm 36 is arranged forwardly of the front end of the main bicycle 6. The trip 33 normally occupies a position with its arms 34 below the sides of the coupling link 30, and with the lower end of its arm 36 spaced forwardly from the main bicycle 6, and it is maintained in this position by the arms 34 which are of greater weight than the arm 36 and are pivotally connected to the auxiliary bicycle near their front ends.

When the lower end of the arm 36 is moved rearwardly with respect to the main bicycle 6, the rear ends of the arms 34 are moved upwardly and carry the coupling link 30 out of the notch 32, with the result that the auxiliary bicycle 7 is uncoupled from the main bicycle 6 to permit the latter to be maintained at the middle tree 3 and to permit the former to move beyond the middle tree in the direction of the tail tree 2. The coupling link 30 is supported in a substantially horizontal position by lugs 37 carried by the auxiliary bicycle 7, and the upper rear corner of the main bicycle 6 is beveled, as at 38, to cause the coupling link to automatically move into engagement with the notch 32 during the final phase of the return movement of the main bicycle in the direction of the middle tree 3. Means mounted on the middle tree 3 function to support the main cable 5 to operate the trip 33 to effect the uncoupling of the auxiliary bicycle 7 from the main bicycle 6, and to maintain the auxiliary bicycle at the middle tree during the movement of the main bicycle toward and away from the middle tree. This means comprises a vertical shaft 39 which is journaled at its upper and lower ends in bearings 40 and 41, respectively. The bearing 40 is provided with a recess 42 for the reception of the reduced lower end 43 of the shaft 39, and the bearing 41 is provided with an opening 44 for the reception of the reduced upper end 45 of the shaft. The bearing 40 is secured to the middle tree 3 by bolts 46 and a brace 47 which is connected at its upper end to this bearing is secured at its lower end to the middle tree by a bolt 48.

The bearing 41 is secured to the middle tree 3 by bolts 49. The lower end portion 43 of the shaft 39 rests in the bearing 40 and the upper end portion 45 of the shaft passes through the bearing 41. A washer 50 and nuts 51 may be applied to said upper end portion above the bearing 41. The middle tree 3 is reinforced by a heavy iron plate 51$^a$ which is secured by the bolts 46, 48 and 49 to that side of the middle tree opposite that side thereof to which the bearings 40 and 41 are secured.

Arms 52 and 53 which have straight inner portions 54 and 55, respectively, and curved outer portions 56 and 57, respectively, are secured to the shaft 39 through the medium of their portions 54 and 55. The arm portions 54 and 55 are secured to the shaft 39 by bolts 58, and they extend horizontally outward from the shaft in right angular relation. The arm portions 56 and 57 curve downwardly and outwardly from the outer ends of the arm portions 54 and 55, and they also curve in the direction of each other from the outer ends of the arm portions 54 and 55. The connection between the arms 52 and 53 is reinforced by lower braces 59 which are secured, as at 60, to the shaft and as at 61 to the arms, and by upper braces 62 which are secured, as at 63, to the shaft and as at 64 to the arms. The arms 52 and 53 are held in relatively spaced relation by a brace 65 which is arranged between and secured at its ends to the outer ends of the arm portions 54 and 55.

Main cable support sheaves 67 and 68 are journaled upon the outer ends of the arm portions 54 and 55 and the shafts 69 thereof and their lower ends secured to said arm portions and their upper ends secured to braces 70 which are arranged upon said arm portions and fixed, as at 71, thereto. The arm portions 54 and 55 are provided with recesses 72 in which the lower portions of the sheaves 67 and 68 are arranged.

The arms 52 and 53 are mounted upon the middle tree 3 for movement into auxiliary bicycle holding position and into auxiliary bicycle releasing position. When in auxiliary bicycle releasing position, the arms 52 and 53 extend from the middle tree 3 in the direction of the skidder spar 1, and when in auxiliary bicycle holding position, the arms extend from the middle tree in the direction of the tail tree. When the arms 52 and 53 are in auxiliary bicycle releasing position, the main cable 5 is supported intermediate the skidder spar 1 and tail tree 2 by the arm 52, and when the arms are in bicycle holding position, the main cable is supported intermediate the skidder spar and tail tree by the arm 53.

The arms 52 and 53 are moved from one of their positions to the other through the medium of the main bicycle 6. During the movement of the main bicycle 6 and auxiliary bicycle 7 from the skidder spar 1 in the direction of the middle tree 3, the arms 52 and 53 are in auxiliary bicycle releasing position, and during this movement of the bicycles, the arm 36 of the trip 33 contacts with the arm 52 with the result that the arms 34 of the trip are swung upwardly and swing the coupling link 30 out of engagement with the main bicycle, and with the result that the arms 52 and 53 are swung into auxiliary bicycle holding position. During this movement of the arms 52 and 53, the arm 53 enters the opening 29 in the auxiliary bicycle 7, and the sheave 68 of this arm moves into contact with the main cable 5. The arm 53 arrests the movement of the auxiliary bicycle 7, and the main bicycle 6 moves from the middle tree 3 in the direction of the tail tree 2. As the skidding cable 8 and slack line 13 are supported above high ground when the bicycle 6 is lifting and conveying a load near tail tree 2, the cable and slack line will not drag on the high ground, with the result that wear on the cable and slack line and resistance to their movement is reduced to the minimum.

During the return of the main bicycle 6 in the direction of the middle tree 3, the coupling link 30 engages in the notch 32 of this bicycle and during the movement of this bicycle and the auxiliary bicycle 7 from the middle tree 3 in the direction of the skidder spar 1, the auxiliary bicycle, by reason of its engagement with the arm 53, moves this arm and the arm 52 into auxiliary bicycle releasing position. The main cable 5 is now supported by the sheave 67 of the arm 52. The curvature of their portions 56 and 57 enables the movement of the arms 52 and 53 into main cable supporting position, and enables the arm 53 to move into auxiliary bicycle engaging position.

From the foregoing description, taken in connection with the accompanying drawings, it will be understood that the apparatus will permit logs to be readily skidded over elevated ground or a hill due to the fact that the main cable is supported at and above the crest of the hill, and due to the fact that the skidding cable and slack line are also supported at and above the crest of the hill. It will also be understood that the apparatus is simple and durable, that it prevents wear on the main cable when the slack thereof is transferred from one side of the middle tree to the other side thereof, and that the apparatus may be used in all construction work where loads are moved from one point to another by means of cables and carriers. Any suitable terminal supports may be used in place of the skidder spar 1 and tail tree 3, and any suitable intermediate support may be used in place of the middle tree 3.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. An apparatus of the character set forth, comprising terminal supports, a cable extending between the supports, a carrier movable on the cable, an intermediate support, and angularly related arms pivoted to the intermediate support for movement in the direction of either terminal support to permit the passage of the carrier, one of said arms supporting the cable when the arms extend from the intermediate support in the direction of one of the terminal supports and the other arm supporting the cable when the arms extend from the intermediate support in the direction of the other terminal support.

2. An apparatus of the character set forth, comprising terminal supports, a cable extending between the supports, a carrier movable on the cable, an intermediate support, angularly related arms pivoted to the intermediate support for movement in the direction of either terminal support to permit the passage of the carrier, and a cable supporting sheave carried by each of said arms, one sheave supporting the cable when the arms extend from the intermediate support in the direction of one of the terminal supports and the other sheave supporting the cable when the arms extend from the intermediate support in the direction of the other terminal support.

3. An apparatus of the character set forth, comprising terminal supports, a cable extending between the supports, a main and an auxiliary bicycle movable on the cable, means releasably connecting the bicycles, an intermediate support, and means carried by the intermediate support for supporting the cable and operating said bicycle connecting means to release the auxiliary bicycle from the main bicycle during the movement of the bicycles from one of the terminal supports in the direction of the intermediate support, said second means being adapted to hold the auxiliary bicycle during the movement of the main bicycle from the intermediate support in the direction of the other terminal support.

4. An apparatus of the character set forth, comprising terminal supports, a cable extending between the supports, a main and an auxiliary bicycle movable on the cable, means releasably connecting the bicycles, an intermediate support, and means carried by the intermediate support for supporting the cable and operating said bicycle connecting means to release the auxiliary bicycle from the main bicycle during the movement of the bicycles from one of the terminal supports in the direction of the intermediate support, said second means being adapted to hold the auxiliary bicycle during the movement of the main bicycle from the intermediate support in the direction of the other terminal support and said connecting means being adapted to engage the main bicycle during the movement of this bicycle from said other terminal support in the direction of the intermediate support, and said second means being adapted to thereafter release the auxiliary bicycle.

5. An apparatus of the character set forth, comprising terminal supports, a cable extending between the supports, a carrier movable on the cable, an intermediate support, angularly related arms pivoted to the intermediate support and having inner horizontal portions and downwardly curved outer portions also curved in the direction of each other, the arms being movable by the carrier in the direction of one or the other of the terminal supports, and a cable supporting sheave carried by the outer ends of the horizontal arm portions, one of said sheaves being adapted to support the cable when the arms extend in the direction of one terminal support and the other sheave being adapted to support the cable when the arms extend in the direction of the other terminal support.

6. An apparatus of the character set forth, comprising terminal supports, a cable extending between the supports, a main and an auxiliary bicycle movable on the cable, a coupling link pivoted to the auxiliary bicycle and engaging the main bicycle, a trip carried by the main bicycle and adapted when operated to disengage the coupling link from this bicycle, the auxiliary bicycle being provided with an opening, an intermediate support, and angularly related arms pivoted to the intermediate support for movement by the main bicycle in the direction of one of the terminal supports or in the direction of the other terminal supports, one of the arms being adapted to operate the trip during the movement of the bicycles in one direction and the other arm being adapted to enter the opening in the auxiliary bicycle during the operation of the trip.

7. An apparatus of the character set forth, comprising terminal supports, a cable extending between the supports, a main and an auxiliary bicycle movable on the cable, a coupling link pivoted to the auxiliary bicycle and engaging the main bicycle, a trip carried by the main bicycle and adapted when operated to disengage the coupling link from this bicycle, the auxiliary bicycle being provided with an opening, an intermediate support, angularly related arms pivoted to the intermediate support for movement by the main bicycle in the direction of one of the terminal supports or in the direction of the other terminal supports, one of the arms being adapted to operate the trip during the movement of the bicycles in one direction and the other arm being adapted to enter the opening in the auxiliary bicycle during the operation of the trip, and a cable contacting sheave carried by each of said arms.

8. An apparatus of the character set forth, comprising terminal supports, a cable extending between the supports, a main and an auxiliary bicycle movable on the cable, a coupling link pivoted to the auxiliary bicycle and engaging the main bicycle, a trip carried by the main bicycle and adapted when operated to disengage the coupling link from this bicycle, the auxiliary bicycle being provided with an opening, an intermediate support, angularly related arms pivoted to the intermediate support for movement by the main bicycle in the direction of one of the terminal supports or in the direction of the other terminal supports, one of the arms being adapted to operate the trip during the movement of the bicycles in one direction and the other arm being adapted to enter the opening in the auxiliary bicycle during the operation of the trip, said arms being provided with horizontal inner portions and downwardly and outwardly inclined outer portions, said outer portions also inclining in the direction of each other and one of said arm portions being adapted to be engaged by the trip and the other arm portion being adapted to enter the opening in the auxiliary carriage.

9. An apparatus of the character set forth, comprising terminal supports, a cable extending between the supports, a main and an auxiliary bicycle movable on the cable, a coupling link pivoted to the auxiliary bicycle and engaging the main bicycle, a trip carried by the main bicycle and adapted when operated to disengage the coupling link from this bicycle, the auxiliary bicycle being provided with an opening, an intermediate support, angularly related arms pivoted to the intermediate support for movement by the main bicycle in the direction of one of the terminal supports or in the direction of the other terminal supports, one of the arms being adapted to operate the trip during the movement of the bicycles in one direction and the other arm being adapted to enter the opening in the auxiliary bicycle during the operation of the trip, said arms being provided with horizontal inner portions and downwardly and outwardly inclined outer portions, said outer portions also inclining in the direction of each other and one of said arm portions being adapted to be engaged by the trip and the other arm portion being adapted to enter the opening in the auxiliary carriage, and a cable contacting sheave carried by the outer ends of said horizontal arm portions.

In testimony whereof I hereunto affix my signature.

GEORGE L. GUM.